United States Patent Office 2,780,642
Patented Feb. 5, 1957

2,780,642

REACTION OF ARYLOXYACETIC ACIDS AND UNSYMMETRICAL EPOXIDES

Roger E. Hatton, St. Louis, and Andrew Lasslo, University City, Mo., assignors to Monsanto Chemical Company, St. Louis, Mo., a corporation of Delaware No Drawing. Application May 7, 1953,
Serial No. 353,682

10 Claims. (Cl. 260—473)

This invention relates to esters of aryloxyacetic acids and more specifically pertains to certain 2-hydroxy esters of aryloxyacetic acids and a method for preparing 2-hydroxy esters of aryloxyacetic acids in general.

Aryloxyacetic acids, their salts, esters and amides are known to possess herbicidal activity. The herbicidal activity of these acids, their salts, esters and amides is not the same against all plants. Some of these compounds are too volatile for use near plants which have an exceptionally low tolerance for any of the forms of this herbicidal family. Certain of the esters especially the ethylene glycol and propylene glycol monoesters of aryloxyacetic acids have been reported to be active herbicides and to possess low volatility.

Several methods for the preparation of glycol esters of aryloxyacetic acids have been proposed. One method suggested is basically the conventional method for esterification and comprises reacting an aryloxyacetic acid with a stoichiometric excess of the glycol, three or more moles of glycol per mole of acid, in the presence of sulfuric acid. Because of the presence of more than one reactive hydroxy group in the glycols, such esterifications employing dihydroxy alcohols having one of the hydroxy groups attached to a non-terminal carbon atom or being otherwise unsymmetrical in the positioning of the hydroxy group result in a mixture of ester products. For example the reaction of 1,2-propanediol with 2,4-dichlorophenoxyacetic acid in the presence of sulfuric acid, although producing a high yield of an ester product does produce a mixture containing the 1-hydroxypropyl and 2-hydroxypropyl 2,4-dichlorophenoxyacetates as well as the diester of the glycol. The quantity of diester produced can be reduced substantially by increasing the ratio of glycol to acid to more than six moles of glycol per mole of aryloxyacetic acid. Even then the ester product contains a mixture of the isomeric esters. The preparation of either hydroxyalkyl ester to the exclusion of the other or to the exclusion of the diester is virtually impossible as long as a bifunctional reactant is employed.

For use in herbicidal applications it is important to employ a glycol monoester of an aryloxyacetic acid which is substantially free from the diester, and preferably absolutely free from the diester. For, in general, the glycol diesters not only have an exteremly low solubility in solvents but also are exceedingly difficult to maintain in aqueous emulsions and dispersions and will form a precipitate when hard water is employed in the preparation of aqueous spray formulations. This precipitate will of course plug the spray nozzles. Thus the presence of the diester in the ester product is indeed undesirable.

It has also been suggested that the glycol monoesters of aryloxyacetic acids be prepared by reacting a sodium salt of the acid with a chloro derivative of the glycol such as 1-chloro-2-hydroxypropane in an alkaline medium. Obviously such a process involves the preparation of and recovery of the chloro derivative as well as other additional process steps and would also produce 1-chloropropyl esters as well as the desired 2-hydroxypropyl esters. Thus such a process would not be desirable for an industrial process.

It has now been discovered that glycol monoesters, and particularly 2-hydroxyalkyl monoesters, of aryloxyacetic acids can be prepared directly to the exclusion of the formation of the isomeric monoester and the diester by reacting an unsymmetrical epoxide with an aryloxyacetic acid in the presence of a strong base and in the presence of water at a temperature not exceeding about 70° C.

The epoxide reactant is known to be rather active because of the instability of the three membered epoxide ring. Usually in an aqueous alkaline medium the epoxide ring opens to form a dihydroxy compound, a glycol. Unless the opening of the epoxide ring is controlled in the esterification process, the use of the epoxide instead of the glycol will be to no avail as far as the production of a pure 2-hydroxyalkayl monoester is concerned. Moreover, if the epoxide esterification process is carried out at a temperature above about 70° C. with the preferred epoxide, a high molecular weight product believed to be a polypropylene glycol ester is formed. To avoid these undesirable side reactions in the process of this invention it is necessary to limit the amount of the strong base employed and to limit the amount of water present in the reaction medium. Both water and the basic material are, nevertheless, essential to the success of the process as an acceptable industrial process. Also for best results, that is, yields of the desired monoester in excess of 80% of the theoretical yield based on the aryloxyacetic acid, the ratio of epoxide to the acid is also critical and for the best results this ratio should be above 2 to 1.

In general, the process of this invention can be carried out in standard industrial equipment in an economical reaction time cycle by the process described above by employing the reactants in a ratio in the range of from 1 to 5 moles of the epoxide per mole of the aryloxyacetic acid in a reaction medium containing more than 1 but less than 10 moles of water, and from 0.005 to 0.10 mole of a water-soluble strong base such as the alkali metal hydroxides and alkaline earth hydroxides. Because of its availability as an inexpensive industrial chemical compound, sodium hydroxide is the preferred strong base for the process of this invention although lithium hydroxide, potassium hydroxide, calcium hydroxide, barium hydroxide, among others, can also be employed.

In general, any epoxide can be employed as a reactant in the process of this invention although the 1,2-epoxides are preferred. Included among the preferred epoxides which are commercially available are such alkylene oxides as ethylene oxide, propylene oxide, butylene oxide, and cyclohexene oxide among others.

The aryloxyacetic acids useful as reactants in the process of this invention include the phenoxy-, toloxy-, and naphthoxyacetic acids. Specific members of these aryloxyacetic acids include the following: phenoxyacetic acid, its alkyl substitution products such as 4-methylphenoxyacetic acid 2,4-dimethylphenoxyacetic acid, 3,4-dimethylphenoxyacetic acid, 3,5-dimethylphenoxyacetic acid, and 2,4,5-trimethylphenoxyacetic acid, its alkoxy derivatives such as 4-methoxyphenoxyacetic acid, its halogen substitution products such as 2-chlorophenoxyacetic acid, 4-chlorophenoxyacetic acid, 2,4-dichlorophenoxyacetic acid, 2,4,5-trichlorophenoxyacetic acid, 2,4,6-trichlorophenoxyacetic acid, 2,3,4,6-tetrachlorophenoxyacetic acid, pentachlorophenoxyacetic acid, 4-bromophenoxyacetic acid, 2,4-dibromophenoxyacetic acid, 2,4,6-tribromophenoxyacetic acid, 4-iodophenoxyacetic acid, 4-fluorophenoxyacetic acid and 2,4-difluorophenoxyacetic acid, and its nitro substitution products such as 4-nitrophenoxyacetic acid toloxyacetic acids, 4-chloro-o-toloxyacetic acid and 4-chloro-m-toloxyacetic acid, 1-naphthoxyacetic acid, 2-naphthoxyacetic acid, alpha-(1-naphthoxy)propionic acid, alpha - (2 - naphthoxy)propionic acid, and their halogen substitution products such as 2-chloro-1-naphthoxyacetic acid and 2,4-dichloro-1-naphthoxyacetic acid.

The reaction of an acid with an epoxide is not new. Brönsted, Kilpatrick and Kilpatrick, J. Am. Chem. Soc., 51, 428 (1929), have reported that the dissociation of acids favor reaction with 1,2-epoxides. They also report that the reaction of the 1,2-epoxide with an acid is increased by the presence of alkali metal ions.

Fraenkel-Conrat and Olcott, J. Am. Chem. Soc., 66, 1420 (1944), have reported a duplication of the work of Brönsted et al. and report that dilute acetic acid was only 3% esterified by a 30 fold excess of propylene oxide in 4 days at room temperature. These authors also report that in the same length of time employing the same reactants under the same reaction conditions except that a small amount of alkali metal ion is added to the reaction medium a substantially completely esterified acetic acid was produced. There is reported in this article that a yield of from 58% to 63% of ethylene glycol monovalerate and propylene glycol-1-monobutyrate were obtained in 4 to 6 days by the reaction at room temperature of 10 to 20 moles of ethylene oxide with one mole of valeric acid and by the reaction of 10 to 20 moles of propylene oxide with one mole of butyric acid in the presence of an aqueous solution containing 0.1 mole of sodium hydroxide per mole of acid. This reference further reports the reaction of amino acids with epoxides.

The reaction of 1,2-epoxides with proteins in neutral aqueous solutions at room temperature is reported by Fraenkel-Conrat, J. Biol. Chem. 154, 227 (1944). The reaction of casein and ethylene oxide; casein, propylene oxide and glacial acetic acid; casein, ethylene oxide and glacial acetic acid; and casein with butylene oxide and glycide is reported in U. S. Patent No. 1,979,601.

However, the process of this invention provides a substantial advancement in the art of esterification of organic acids and especially the esterification of aryloxyacetic acids acceptable for industrial practice in that yields of the desired 2-hydroxyalkyl ester in excess of 80% can be obtained in but a few hours. The best mode of operation of the process of this invention comprises reacting from 3 to 4 moles of a 1,2-epoxide with one mole of an aryloxyacetic acid in the presence of from 3 to 6 holes of water and from 0.01 to 0.02 mole of a water-soluble strong base at a temperature above 25° C. but not exceeding about 70° C. when the process is carried out at atmospheric pressure as is preferred and employing propylene oxide as the epoxide reactant. However, pressures below and above atmospheric pressure can be employed, if desired, keeping in mind that the maximum reaction temperature must accordingly be adjusted so that it does not exceed that temperature at which a polyglycol ester is formed. The maximum temperature in any case is about that at which the glycol, corresponding to the epoxide, dimerizes or polymerizes.

By following the above described process, yields of the desired hydroxyalkyl esters of aryloxyacetic acids, especially the 2-hydroxyalkyl esters of aryloxyacetic acids, of 90% and above can be obtained in as short a reaction time as five hours. Not only is the reaction time short for an esterification process, but the high yield of substantially pure ester readily recoverable from the reaction product is also unusual in the preparation of hydroxyalkyl esters.

The following specific examples illustrate the process of this invention with detailed descriptions of the preparation of specific 2-hydroxyalkyl esters. The term "parts" is employed to indicate parts by weight and all pressures are absolute. Although precise proportions of specific reactants and agents are employed in the following examples it is not desired or intended that the process be limited solely thereto, for as hitherto stated, the proportions of reactants and reaction agents can be varied within the limits hereinbefore set forth, the precise proportions of materials employed in the process can be varied as desired to fit the needs of the reaction equipment and the amount of ester product desired.

*Example I*

There is added to a suitable reactor 221 parts by weight of 2,4-dichlorophenoxyacetic acid, 290 parts by weight of propylene oxide (a mole ratio of 1 to 5), 100 parts by weight of water in which 3.0 parts by weight of sodium hydroxide are dissolved. (A ratio of 5.5 moles of water and .075 mole of NaOH per mole of 2,4-D acid). This mixture is stirred and maintained at a temperature of about 52° as a maximum for 48 hours with external cooling since the reaction is exothermic.

The resulting hot liquid mixture is subjected to distillation at a reduced pressure of about 300 mm. Hg and a binary fraction, 224 parts by weight, containing propylene oxide and some water are collected. The pressure is further reduced to 30 mm. Hg, the residual material in the still is heated to about 72° C., and about 5 parts of material is distilled off. The liquid remaining in the still is heated to 115° C. at about 0.3 to 0.5 mm. Hg and 90 parts by weight, probably dipropylene glycol is recovered.

The material remaining in the still, 294 parts by weight, is removed from the still, dissolved in ethyl ether, washed with a dilute aqueous solution of sodium carbonate to remove unreacted 2,4-D acid, and the ether solution is recovered, washed three times with water, and dried over anhydrous sodium sulfate.

The dried ether solution is charged to reduced pressure distillation equipment and the ether removed as rapidly as possible at reduced pressure with a stream of dried air being bubbled into the solution. The residue in the still is heated at about 0.8 mm. Hg and 110° C. to 120° C. with dry air being fed into the vapor space over the liquid in the still through a capillary. After 2 hours at 0.8 mm. Hg the heating and evacuation is discontinued, the residue liquid allowed to cool to room temperature and the pressure increased to atmospheric pressure by drawing dry air into the system.

By the process described above 228 parts by weight of a liquid identified as 2-hydroxypropyl 2,4-dichlorophenoxyacetate are recovered representing a yield of about 82% based on the 2,4-D acid.

*Example II*

The process of Example I is repeated except that 2,4-D acid and propylene oxide are employed in the molar ratio of 1 to 3 and the quantity of water and sodium hydroxide is reduced to 3.33 moles of water and 0.019 mole of NaOH per mole of 2,4-D acid. The maximum reaction temperature is 66° C. and the reaction time is reduced to 24 hours. By following the same purification and recovery process described in Example I there is recovered 263 parts by weight, a 94% yield based on the 2,4-D acid, of 2-hydroxypropyl 2,4-dichlorophenoxyacetate whose index of refraction ($n_D^{25}$) is 1.5371, and having a specific gravity at 25° C. of 1.3481.

*Example III*

The process described in Example II is repeated except that the condensation reaction is stopped at five hours. The purification and recovery process is the same. By this modified process 259 parts by weight of 2-hydroxypropyl 2,4-dichlorophenoxyacetate, a 93% yield, is recovered.

*Example IV*

The condensation process of Example II is repeated except that the time of reaction is reduced to seven hours and the crude ester product is purified without employing a solvent as follows. The hot liquid reaction mixture is first subjected to a reduced pressure of 300 mm. Hg to remove unreacted propylene oxide and some water and then heated at 100° C. and 20 mm. Hg to remove reaction by-products. This partially purified liquid residue is washed with dilute aqueous sodium carbonate solution to remove unreacted 2,4-D acid, washed with water and dried at 13 mm. Hg at 104° C. for 25 minutes. By this process a yield of over 90% (based on the 2,4-D acid) of 2-hydroxypropyl 2,4-dichlorophenoxyacetate is obtained.

*Example V*

The process of Example II is repeated except that a molar ratio of 2,4,5-trichlorophenoxyacetic acid to propylene oxide of 1 to 3 is employed. There is obtained a good yield of 2-hydroxypropyl 2,4,5-trichlorophenoxyacetate having a specific gravity at 25° C. of 1.437 and an index of refraction ($n_D^{25}$) of 1.551.

*Example VI*

The process of Example II is repeated except that a molar ratio of 2-methyl-4-chlorophenoxyacetic acid to propylene oxide of 1 to 3 is used. A yield of about 90% of 2-hydroxypropyl 2-methyl-4-chlorophenoxyacetate having a specific gravity at 25° C. of 1.2267 and an index of refractivity ($n_D^{25}$) of 1.5234 is obtained.

When the process of Example II is repeated employing 3 moles of propylene oxide per mol of 1-naphthoxyacetic acid, 2-hydroxypropyl 1-naphthoxyacetate may be produced in good yields.

In the examples above the process of this invention has been illustrated exclusively by the use of propylene oxide as the epoxide reactant. Other epoxides hereinbefore set forth can be substituted for propylene oxide with substantially equivalent results. For example when three moles of butylene oxide is reacted at about 60° C. with one mole of 2,4-D acid in the presence of 0.02 mole of sodium hydroxide and 3.33 moles of water for six hours, a good yield of 2-hydroxybutyl 2,4-dichlorophenoxyacetate may be recovered. In a like manner high yields of substantially pure hydroxyalkyl monoesters will be obtained when other 1,2-epoxides are employed as reactants.

What is claimed is:

1. The method which comprises reacting an aryloxyacetic acid with an unsymmetrical 1,2-epoxide in the molar ratio of from about one to about five moles of the epoxide per mole of the acid in the presence of from 0.005 to 0.10 mole of a strong base and in the presence of more than 1 but less than 10 moles of water per mole of acid at a temperature above 25° C. but below the polymerization temperature of the epoxide, removing the unreacted epoxide and acid and drying the resulting product thereby producing only a mono(2-hydroxy) alkyl aryloxyacetate.

2. In the process for preparing a mono(2-hydroxy) alkyl aryloxyacetate, the step comprising reacting an unsymmetrical 1,2-epoxide with an aryloxyacetic acid in the molar proportions of from more than one mole to about five moles of epoxide per mole of acid in the presence of from 0.005 to 0.10 mole of a water-soluble strong base and from more than 1 to about 10 moles of water per mole of acid at a temperature above 25° C. but below the polymerization temperature of the epoxide.

3. In the process for preparing a 2-hydroxyalkyl ester of an aryloxyacetic acid, the step comprising reacting unsymmetrical 1,2-epoxide with an aryloxyacetic acid in the molar proportions of more than one to about five moles of epoxide per mole of acid in the presence of 0.005 to 0.10 mole of sodium hydroxide and from more than 1 but less than 10 moles of water per mole of acid at a temperature above 25° C. but below 70° C.

4. In the process for preparing a 2-hydroxypropyl ester of an aryloxyacetic acid, the step comprising reacting propylene oxide with an aryloxyacetic acid in the molar proportions of from about 3 to about 4 moles of propylene oxide per mode of acid in the presence of from 0.01 to 0.02 mole of an alkali metal hydroxide and in the presence of 3 to 6 moles of water per mole of acid at a temperature above 25° C. but not exceeding about 70° C.

5. The process of claim 4 wherein the alkali metal hydroxide is sodium hydroxide.

6. In the process for preparing a 2-hydroxypropyl chloroaryloxyacetate, the step comprising reacting propylene oxide with a chloroaryloxyacetic acid in the molar proportions of from 3 to about 4 moles of said oxide per mole of acid in the presence of from 0.01 to 0.02 mole of sodium hydroxide per mole of acid and in the presence of from about 3 to about 6 moles of water per mole of acid at a temperature above 25° C. but not exceeding about 70° C.

7. In the process for preparing 2-hydroxypropyl 2,4-dichlorophenoxyacetate the steps comprising reacting propylene oxide with 2,4-dichlorophenoxyacetic acid in the molar proportions of from about three to about four moles of propylene oxide per mole of acid in the presence of from 0.01 to 0.02 mole of sodium hydroxide per mole of acid and in the presence of from about 3 to about 6 moles of water per mole of acid at a temperature above 25°C. but not exceeding about 70° C.

8. In the process for preparing 2-hydroxypropyl 2,4,5-trichlorophenoxyacetate the steps comprising reacting propylene oxide with 2,4,5-tricholorphenoxyacetic acid in the molar proportions of from about three to about four moles of propylene oxide per mole of acid in the presence of from 0.01 to 0.02 mole of sodium hydroxide per mole of acid and in the presence of from about 3 to about 6 moles of water per mole of acid at a temperature above 25° C. but not exceeding about 70° C.

9. In the process for preparing 2-hydroxypropyl 2-methyl-4-chlorophenoxyacetate the steps comprising reacting propylene oxide with 2-methyl-4-chlorophenoxyacetic acid in the molar proportions of from about three to about four moles of propylene oxide per mole of acid in the presence of from 0.01 to 0.02 mole of sodium hydroxide per mole of acid and in the presence of from about 3 to about 6 moles of water per mole of acid at a temperature above 25° C. but not exceeding about 70° C.

10. the process of claim 3 where the aryloxyacetic acid is a naphthoxyacetic acid and the ester produced is a 2-hydroxypropyl naphthoxyacetate.

References Cited in the file of this patent

UNITED STATES PATENTS

| 1,883,182 | Webel | Oct. 18, 1932 |
| 2,607,761 | Seymour | Aug. 12, 1952 |
| 2,628,941 | Adelson et al. | Feb. 17, 1953 |

OTHER REFERENCES

Hammett: "Physical Organic Chemistry," pp. 301–2, McGraw-Hill, 1940.

Fraenkel-Conrat et al.: J. Am. Chem. Soc. 66, 1420–1 (1944).